106. COMPOSITIONS, COATING OR PLASTIC
SUBSTITUTED FOR MISSING COPY.
Search Room
275
BEST AVAILABLE COPY

UNITED STATES PATENT OFFICE.

ANDREW B. DEAN, OF LOUISVILLE, KENTUCKY.

IMPROVEMENT IN PAVEMENTS.

Specification forming part of Letters Patent No. 161,013, dated March 23, 1875; reissue No. 6,570, dated August 3, 1875; application filed July 3, 1875.

*To all whom it may concern:*

Be it known that I, ANDREW B. DEAN, of Louisville, in the county of Jefferson and State of Kentucky, have invented a new and valuable Improvement in Asphalt Compounds; and I do hereby declare that the following is a full, clear, and exact description of the same.

This invention has relation to asphalt compounds for paving carriage-ways, sidewalks, and for other purposes; and it consists in utilizing a substance known as "candle-gum," by mixing this substance with asphaltum in such proportions as will give to it stronger cohesive properties and a good tough body, that will be impenetrable by water, unaffected by moisture or frost, and which will be nearly imperishable under ordinary uses.

The candle-gum is known by those acquainted with its peculiarities to possess great cohesive, durable, and preservative properties; and when it is properly incorporated with hard mineral substances it will make a substantial pavement without the addition of asphalt; but, as water-lime, when properly combined with sand, will, under the effects of moisture, form a more durable cement than either material would make when used alone, so it is with candle-gum when mixed with asphalt by melting them together. The candle-gum supplies a most perfect and durable body and life not contained in the asphalt, and when the candle-gum is thoroughly infused into the asphalt, and properly mixed with mineral substances, and firmly compressed, the compound will set and form a body possessing all the qualities above stated.

To make a good pavement, a solid foundation is a most important feature, and the following description will enable others to carry my invention into effect.

First, prepare a foundation of broken stone or coarse gravel, and fill all the lower interstices with sand or fine gravel, leaving the surface irregular and rugged, to afford a better hold and a stronger connection with the surface-paving. I then take the candle-gum and melt it until it is in a liquid state, and apply a thin coating of it to the surface of the foundation. This application is made to afford a more perfect bond of union between the surface-paving and the foundation. I then put into a suitable vessel asphaltum and candle-gum in such proportions as the climate and character of the work require, and heat these substances to a liquid state and thoroughly mix with them any hard mineral substance, such as coarse gravel, broken stone, &c., with a quantity of sand. This compound is evenly spread over the substratum or foundation, and firmly pressed, so as to fill every space in the rugged surface thereof. This will hold the foundation in an unbroken body. Over this layer I spread a surface-coating of coarse sand and fine gravel or finely-broken stone, mixed with hot candle-gum and asphaltum, and treated in the same manner as the intermediate coating. This final coating should be compressed, while it is hot. The compression is best performed by means of a roller, the surface of which should be kept moistened while in use.

My improved pavement may be made by using the candle-gum and asphalt for the binder, properly intermixed with mineral substances, either with or without the addition of another material intermixed with the candle-gum and asphalt.

The substance which I have hereinabove denominated candle-gum is a sulphureted hydrocarbon, and, as usually prepared, is composed of hydrocarbon, sulphur, and traces of iron, copper, oxygen, and nitrogen. Candle-gum, or, as it is sometimes called, "candle-tar," is a residuum left after the distillation of fatty bodies used in the manufacture of candles—such, for instance, as tallow-grease from pork-houses, stearine, and palm-oil, and other animal and vegetable oils. The fats or oils are treated with sulphuric acid at a high temperature, which blackens the fat. This black substance is then treated with steam in boiling water; then heated in a copper still to about 400° Fahrenheit, after which superheated steam is allowed to escape into the fat, which distills the fat over into a worm or condenser, out of which the product flows off as in ordinary distillation, and is made white by the application to it of hydrostatic pressure. The residue in the copper still is then removed to an iron still, where the heat is increased to about 500° Fahrenheit. The steam-distillation is continued, as before, until no more fatty matter runs from the condensing-worm. The residue in the iron still is the substance in question.

This is one of the well-known processes for producing the candle-gum, and is not herein claimed; nor do I limit myself to this substance when produced by any other process.

What I claim as new, and desire to secure by Letters Patent, is—

1. A compound consisting of a substance known as candle-gum mixed with asphaltum, as described.

2. A pavement the binder of which is candle-gum and asphalt mixed together and incorporated with sand, gravel, broken stone, or other hard mineral substance, as set forth.

In testimony that I claim the above I have hereunto subscribed my name in the presence of two witnesses.

ANDREW B. DEAN.

Attest:
W. SHORT,
J. W. SCHEURER, Jr.